United States Patent [19]

Perr

[11] Patent Number: 4,471,909
[45] Date of Patent: Sep. 18, 1984

[54] MINIATURIZED UNIT FUEL INJECTOR

[75] Inventor: Julius P. Perr, Columbus, Ind.

[73] Assignee: Cummins Engine Company, Inc., Columbus, Ind.

[21] Appl. No.: 332,249

[22] Filed: Dec. 18, 1981

[51] Int. Cl.³ .................. F02M 53/04; F02M 55/00
[52] U.S. Cl. .................................. 239/89; 239/95; 239/124; 239/132.5
[58] Field of Search .................. 239/88–91, 239/93, 95, 124, 125, 132.5, 533.2–533.12, 584

[56] References Cited

U.S. PATENT DOCUMENTS

| | | | |
|---|---|---|---|
| 3,351,288 | 11/1967 | Perr | 239/90 X |
| 3,544,008 | 12/1970 | Reiners et al. | 239/90 |
| 3,557,765 | 1/1971 | Nystrom . | |
| 4,146,178 | 3/1979 | Bailey | 239/90 |
| 4,280,659 | 7/1981 | Gaal et al. | 239/124 |

FOREIGN PATENT DOCUMENTS 202734 7/1956 Australia .

Primary Examiner—Andres Kashnikow
Attorney, Agent, or Firm—Sixbey, Friedman & Leedom

[57] ABSTRACT

A unit injector (2) of the cam actuated, open nozzle type is disclosed in which an extremely compact injector body (4) has a minimum number of internal flow passages (66, 72) designed to reduce the complexity and cost of manufacture of the injector. The invention is characterized by an injector body (4) having an exterior shape designed to form a fuel supply flow path (22) and an isolated fuel drain flow path (24) between the exterior surface of the injector body (4) and the interior surface of the recess (6) in which the injector (2) is designed to be received. This arrangement allows a very simple pattern of radial passages (66, 72) to be formed in the injector body (4) even through the injector (2) is designed to provide scavenging fuel flow previously requiring a much more complex injector design.

8 Claims, 2 Drawing Figures

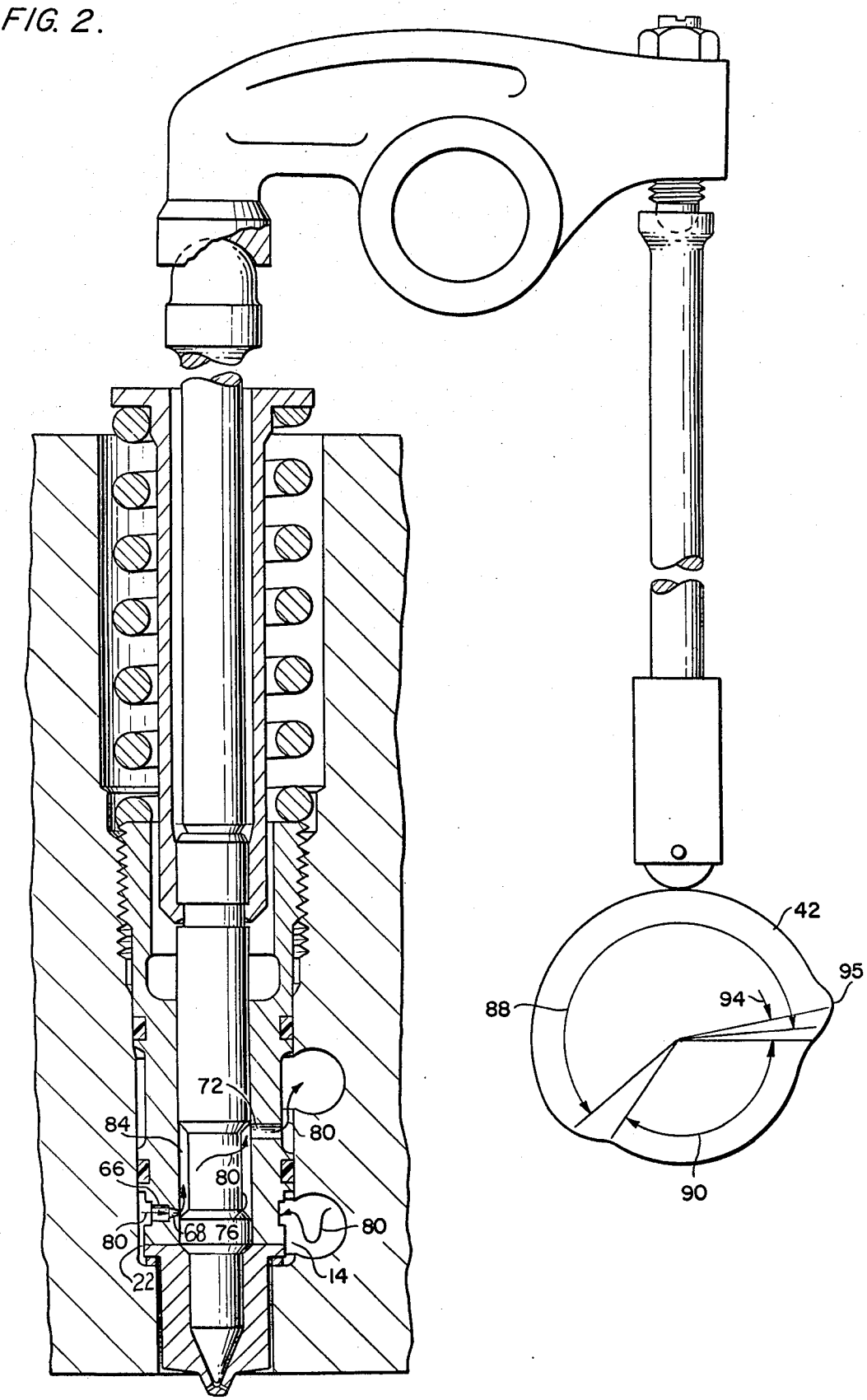

MINIATURIZED UNIT FUEL INJECTOR

DESCRIPTION

Technical Field

This invention relates to a low cost, miniaturized unit fuel injector of the type having an open nozzle and a reciprocating injector plunger mechanically actuated by an engine camshaft.

Background Art

Internal combustion engine designers have increasingly come to realize that substantially improved fuel supply systems are required in order to obtain higher levels of pollution abatement and increased fuel economy. Among the known options, direct fuel injection appears to be one of the best candidates for achieving improved performance but higher initial costs have tended to discourage its general adoption. This situation is accentuated by the fact that only the more sophisticated, and therefore normally the more expensive, direct injection systems are capable of achieving the increasingly higher performance goals of engine manufacturers.

Up to the present, attempts to provide a low cost fuel injection system have tended to center on distributor type fuel injection systems having a single centralized high pressure pump and a distributor valve for metering and timing fuel flow from the pump to each of a plurality of injection nozzles, such as disclosed in U.S. Pat. No. 3,557,765. Although simple in design concept, systems of this type generally suffer defects inherent with separation of the injector nozzles from the centralized pump. Unit injector systems avoid the inherent defects of distributor type systems by providing each engine cylinder with its own cam-actuated pump such as disclosed in U.S. Pat. No. 3,544,008. Nevertheless, the performance advantage of unit injectors have generally not outweighed the detriment of greater costs except for heavy duty compression ignition engine applications.

While unit injectors have not normally been employed in low cost fuel systems, numerous refinements have been proposed over the years in an attempt to lessen their cost while retaining their inherent advantages. For example, the assignee of this application, Cummins Engine Company, Inc., has developed an open nozzle, pressure/time unit injector (see U.S. Pat. Nos. 3,351,288 and 3,544,008) which is characterized by the need for only a single supply line (common rail) for supplying fuel to all of the injectors. Because fuel is metered into each injector through a separate feed orifice, the time during which each feed orifice is open and the pressure within the common rail can be relied upon to control the quantity of fuel metered for injection during each injection cycle. Additional cost reductions are realized because an open nozzle unit injector does not require a pressure relief valve at the injection orifice.

While effective in providing cost reductions, certain precautions are usually required in pressure/time, open nozzle injector systems to insure that combustion gases and spurious pressure signals do not enter the fuel supply system. These precautions may include the use of a check valve, upstream from the feed orifice of the injector to discourage combustion gases (known as blow-back) from entering the fuel supply. It is also common to provide for scavenging flow of fuel through the injector to remove gases which may have entered the fuel supply line. Scavenging flow additionally serves the function of cooling the injector and would be useful even if it were unnecessary to remove blow-back gases. Thus, a commercially acceptable unit injector, even when designed in accordance with principles intended to simplify the injector structure, is typically a labyrinth of axial and radial drillings. As used in this application, "axial" means parallel with the longitudinal axis of the injector and "radial" means perpendicular to the longitudinal axis of the injector. Moreover, the injector body is usually formed of multiple components requiring very close tolerance controls.

In very simple cam actuated injectors such as illustrated in Australian Pat. No. 202,734, axial drillings have been eliminated from the injector body by forming a flow path between the exterior of the injector body and the interior of the recess in which the injector body is received. By this arrangement, an easily formed radial bore may be provided in the injector body to act as a feed passage from the supply flow path surrounding the injector body into the injector chamber of the unit injector. If the injector is capable of providing a scavenging fuel flow as illustrated in U.S. Pat. No. 3,351,288, the number of necessary flow passages increases and the overall size of the injector must increase to accommodate such passages. Multi-function injectors of this type normally require at least one or more axial passages. Such passages are more difficult and costly to form and have not been eliminated even in injector designs in which the supply and drain lines leading to and from the injector are formed entirely within the engine head such as is illustrated in U.S. Pat. No. 3,351,288.

In short, fuel injectors capable of meeting rigorous operation specifications have invariably been highly complex, costly to manufacture, and/or relatively large in size.

Disclosure of the Invention

The first object of this invention is to overcome the deficiencies of the prior art described above by providing a fuel injector of greatly simplified design but which is capable of performing a variety of functions previously associated only with more complex designs.

The second object of this invention is to provide a highly compact, unit injector formed of multi-function components including an injector body having a minimal number of fluid flow passages, most of which are arranged in a generally radial direction to decrease manufacturing costs.

The third object of this invention is to provide a unit injector in which individual components and passages are shaped and organized to perform multiple functions previously requiring a significantly greater number of injector components. In particular, a radially directed supply passage containing a feed orifice for metering fuel into the injector may also serve to supply fuel to the injector for scavenging and cooling purposes.

Still other and more specific objects of this invention may be understood from an examination of the following Brief Description of the Drawings and Best Mode for Carrying Out the Invention.

BRIEF DESCRIPTION OF THE DRAWINGS

FIG. 2 is a partially broken away cross-sectional view of the unit injector illustrated in FIG. 1 in which the injector plunger has been moved by a cam actuation means to an outermost position.

BEST MODE FOR CARRYING OUT THE INVENTION

Figure 1:
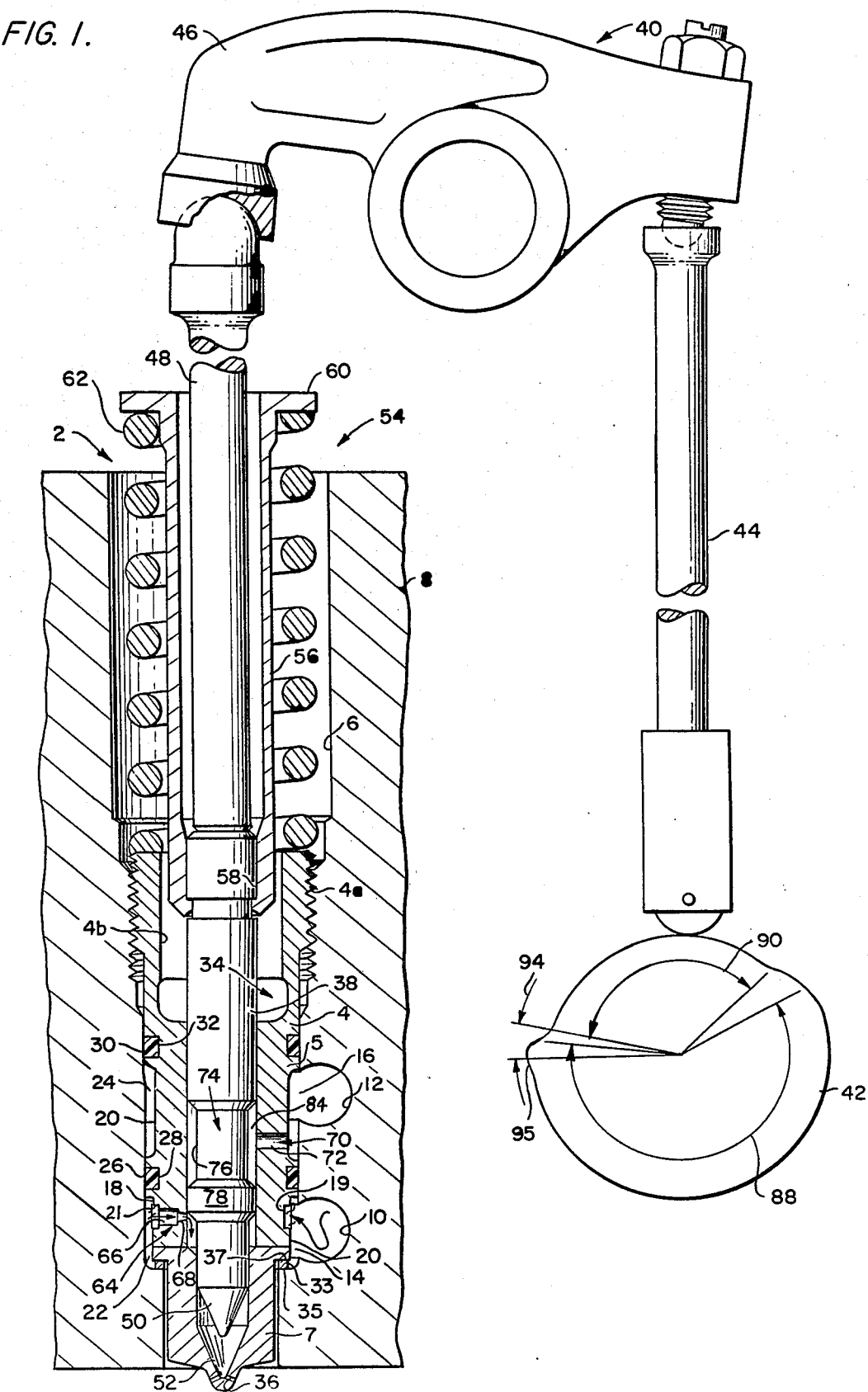
FIG. 1 is a partially broken away cross-sectional view of one embodiment of the subject invention employing a greatly simplified arrangement of fuel supply and drainage passages.

Throughout this application, the words "inward" and "outward" will correspond to the directions, respectively, toward and away from the point at which fuel from an injector is actually injected into the combustion chamber of an engine. To further aid in an understanding of this invention, an index of the elements identified by reference numerals in the drawings is listed at the end of this description of the Best Mode for Carrying Out the Invention.

FIG. 1 illustrates an open nozzle, pressure/time unit injector designed in accordance with the subject invention. In particular, FIG. 1 shows a unit injector 2 including an injector body 4 received in a recess 6 contained in the head 8 (only partially illustrated) of an internal combustion engine. Injector body 4 is actually formed in two sections including an upper section or barrel 5 and lower section or cup 7 which is integrally joined to barrel 5. As is apparent from FIG. 1, injector body 4 is held within the recess 6 by means of mating screw threads 4a and may be placed in position by means of a torque applying wrench adapted to mate with a hexagonal socket 4b contained in the upper end of the injector body 4.

Fuel supply and drainage is provided for the injector through passages contained entirely within head 8. In particular, a supply channel 10 (sometimes referred to as a common rail) is adapted to supply fuel to the unit injector 2 while a drain channel 12 is adapted to receive fuel discharged from the injector for return to the fuel supply system. Both channel 10 and channel 12 may be formed to communicate with each of a plurality of injector receiving recesses positioned within head 8 to eliminate all external flow passages to and from the injectors. As illustrated in FIG. 1, the intersection of channel 10 with recess 6 defines a supply port 14. Similarly, the intersection of channel 12 and recess 6 defines a drain port 16.

The exterior surface of the injector body 4 is shaped to provide first and second annular recesses 18 and 20 axially spaced to communicate with channels 10 and 12 through supply port 14 and drain port 16, respectively. By this arrangement, a supply flow path 22 is formed between supply port 14 and the exterior surface of the injector body 4 defining first annular recess 18. Similarly, a drain flow path 24 is formed between drain port 16 and the exterior surface of the injector body 4 which defines second annular recess 20. In order to isolate flow paths 22 and 24, a circumferential seal 26 is positioned between the injector body 2 and the interior surface of recess 6. As is apparent from FIG. 1, the circumferential seal 26 may be positioned within a first annular groove 28 located between annular recesses 18 and 20. A similar type of circumferential seal 30 is positioned within a second annular groove 32 located above the drain flow path 24 to insure against fuel leakage. The inner end of supply flow path 22 is sealed by means of a washer-like seal element 33 compressibly held between an radially directed lip 35 formed in recess 6 and an radially directed surface 37 formed on injector body 4. To prevent particles from entering the injector body 4, first annular recess 18 may contain an annular undercut 19 covered by a filter screen 21 through which fuel entering the injector body 4 must pass.

Injector body 4 contains a central bore 34 which is coaxial with the longitudinal axis of the injector body 4. At the inner (lower) end of the injector body 4, one or more small injection orifices 36 are contained to provide a communication path between central bore 34 and a combustion chamber (not illustrated). Fuel is supplied to the combustion chamber through injection orifices 36 in controlled synchronism with the operation of the corresponding cylinder piston (not illustrated). Positioned within central bore 34 is an injector plunger 38 adapted to reciprocate in response to a cam-actuated mechanism 40 including a specially profiled cam lobe 42 connected to the conventional cam shaft (not illustrated) of the engine. Cam actuated mechanism 40 further includes a push rod 44, rocker arm 46 and a link 48. Because cam lobe 42 is rotated in a fixed manner relative to the reciprocating motion of the cylinder piston, injector plunger 38 may have its reciprocating motion very precisely controlled with respect to movement of the cylinder piston by carefully shaping the profile of cam lobe 42. Essentially, injector plunger 38 reciprocates between an innermost position (FIG. 2) in which injection orifices 36 are closed by the inner end 50 of plunger 38 and an outermost position (FIG. 1) in which an injection chamber 52 is formed within central bore 34 between the inner end 50 of injector plunger 38 and the injection orifices 36. Since this invention relates to injectors of the "open nozzle" type, injection orifices 36 remain open to the combustion chamber whenever injector plunger 38 is moved outwardly from its innermost position. Injectors of this type have an inherent cost advantage over more complex closed nozzle injectors which employ a pressure released tip valve for maintaining the injection orifice in a closed condition except during the injection event. Injector plunger 38 is permanently biased toward its innermost position illustrated in FIG. 1 by a plunger return means 54 including a sleeve-like coupler 56 connected at its lower end 58 to the upper end of injector plunger 38. A radially, outwardly directed flange 60 is positioned adjacent the topmost portion of coupler 56. A fairly high pressure compression spring 62 extends between the upper end of injector body 4 and flange 60 to continually bias injector plunger 38 inwardly.

To control the amount of fuel injected during each inward movement of injector plunger 38, unit injector 2 is provided with a "pressure/time" injection capability in which fuel is metered into the injection chamber before each injection stroke through a fill or feed orifice which has been carefully dimensioned to allow the amount of fuel injected to be varied within a given amount of time by varying the supply line (common rail) pressure. Thus, the amount of fuel actually metered is a function of the supply pressure and the total metering time during which fuel flows through the feed orifice. This principle is applied to unit injector 2 by provision of a supply connecting means 64 for providing a pathway for fuel under pressure to flow from the supply flow path 22 into the portion of the central bore 34 which forms injection chamber 52. The supply connecting means 64 includes a supply passage 66 extending from the exterior surface of the injector body 4 to the interior surface of the central bore 34 along a straight radial path perpendicular to the longitudinal axis of the injector body 4. A restricted portion of supply passage 66 forms a feed orifice 68 which has carefully controlled hydraulic characteristics in order to produce the desired pressure/time metering capability discussed above.

Drain connecting means 70 is formed in the injector body 4 to provide a pathway for fuel to flow from the central bore 34 into the drain flow path 24. In a manner similar to the formation of supply passage 66, the drain connecting means 70 is produced by forming a drain passage 72 extending from the exterior surface of the injector body 4 to the interior surface of central bore 34 along a straight radial path perpendicular to the longitudinal axis of the injector body 4. Radial passages are significantly less expensive to manufacture as compared with axially arranged passages. Thus, the injector design of FIG. 1 achieves significant cost savings by employing the arrangement of flow paths and passages illustrated in FIG. 1.

To achieve the desired injector operation, flow control means 74 is provided on injector plunger 38 to form a scavenge flow path 84 in which fuel flows through the injector to scavenge blow back gases whenever the injector plunger 38 is less than a first predetermined axial distance from its innermost position. Flow control means 74 also allows fuel to be metered into the injector chamber 52 from the supply passage 66 only when the injector plunger 38 is moved outwardly more than a second predetermined distance from the innermost position. Flow control means 74 includes an annular groove 76 on the exterior surface of the injector plunger 38 extending axially from the supply passage 66 to the drain passage 72 when the injector plunger 38 is at its innermost position as illustrated in FIG. 2. A cylindrical land 78 is formed below or inwardly of groove 76 to cooperate with the interior surface of the central bore 34 to form a seal between the scavenge flow path formed by groove 76 and the injector chamber 52. Injector plunger 38 is positioned at the first predetermined distance from its innermost position when the upper (outer) edge of cylindrical land 78 is located slightly inwardly from the upper (outer) edge of feed orifice 68. In this position, fuel may begin to flow into the scavenge flow path 84 formed by annular groove 76. Alternatively, injector plunger 38 is positioned at the second predetermined distance when the lower (inner) edge of cylindrical land 78 is located slightly outwardly of the lower (inner) edge of feed orifice 68 to allow fuel to begin to flow into injector chamber 52. Obviously, the first predetermined distance is less than the second predetermined distance by an amount approximately equal to the axial extent of the cylindrical land 78 plus the axial extent of the opening of the feed orifice 68 into central bore 34.

The operation of the embodiment illustrated in FIG. 1 can now best be understood by also referring to FIG. 2 which discloses the same injector in which the injector plunger 38 has been moved to its innermost position. As illustrated by arrows 80 in FIG. 2, fuel enters through supply port 14 into the supply flow path 22 formed by annular groove 18 and then enters supply passage 66 for passage subsequently into scavenge flow passage 84 formed by groove 76 and is discharged through drain passage 72. The scavenging flow performs two very useful functions which are to cool the injector and to remove any combustion gases which may have entered through open injection orifices 36 into the fuel supply line. When the injector plunger 38 is moved outwardly sufficiently to open feed orifice 68, as illustrated in FIG. 1, fuel will flow into injection chamber 52 in an amount dependent upon the pressure in supply channel 10 and the length of time which feed orifice 68 remains open.

In the absence of any specialized timing control capability, the amount of time which the injector plunger 38 dwells in either the innermost or outermost position depends upon the profile of cam lobe 42. As is apparent from FIGS. 1 and 2, a possible design for cam lobe 42 includes a first sector 88 comprising more than 180° of the total circumference of cam lobe 42. Sector 88 causes the injector plunger 38 to assume the innermost position. A second sector 90 causes the plunger to assume an outermost position as illustrated in FIG. 1.

First sector 88 engages the lower end of push rod 44 at the point just before the engine piston executes its power stroke and continues to engage rod 44 throughout the exhaust stroke and a portion of the intake stroke of the piston. Second sector 90 engages rod 44 approximately halfway through the intake stroke of the piston and ceases to engage rod 44 near the beginning of the power stroke. Second sector 90 defines the time during each injector cycle when fuel is metered into the injection chamber 52. The small sector 94 is that portion of cam lobe 42 which causes injector plunger 38 to move from its outermost position to its innermost position to force the metered fuel in chamber 52 through injection orifices 36 into the combustion chamber of the engine. A slightly raised dimple 95 (exaggerated in FIGS. 1 and 2) is formed on cam lobe 42 near the end of sector 94 to place a "crush load" on injector plunger 38 at the end of the injection event in order to hold the injector plunger 38 tightly against the injector cup 7. This ability to hold plunger 38 very tightly against the injector cup 7 insures that injection orifices 36 will be sharply closed and will remain closed at the end of each injection period.

An especially simple unit injector has been described which uses the space between the injector body and the recess within which it is positioned during use to eliminate the need for axial flow passages within the injector body. Only relatively inexpensive radial passages are required to provide both pressure/time metering and scavenge fuel flow in the injector.

| | Index to Reference Numbers |
|---|---|
| 2 | unit injector |
| 4 | injector body |
| 4a | screw threads |
| 4b | hexagonal socket |
| 5 | upper section or barrel |
| 6 | recess |
| 7 | lower section or cup |
| 8 | head |
| 10 | supply channel |
| 12 | drain channel |
| 14 | supply port |
| 16 | drain pott |
| 18 | first annular recess |
| 19 | annular undercut |
| 20 | second annular recess |
| 21 | filter screen |
| 22 | supply flow path |
| 24 | drain flow path |
| 26 | circumferential seal |
| 28 | first annular groove |
| 30 | circumferential seal |
| 32 | second annular groove |
| 33 | washer-like seal element |
| 34 | central bore |
| 35 | lip |
| 36 | injection orifice |

| Index to Reference Numbers | |
|---|---|
| 37 | radially directed surface |
| 38 | injector plunger |
| 40 | cam actuated mechanism |
| 42 | cam lobe |
| 44 | push rod |
| 46 | rocker arm |
| 48 | link |
| 50 | inner end |
| 52 | injection chamber |
| 54 | plunger return means |
| 56 | coupler |
| 58 | lower end of coupler |
| 60 | flange |
| 62 | compression spring |
| 64 | supply connecting means |
| 66 | supply passage |
| 68 | feed orifice |
| 70 | drain connecting means |
| 72 | drain passage |
| 74 | flow control means |
| 76 | annular groove |
| 78 | cylindrical land |
| 80 | arrows |
| 84 | scavenge flow path |
| 88 | first sector |
| 90 | second sector |
| 94 | small sector |
| 95 | raised dimple |

Industrial Applicability

A miniaturized unit injector designed in accordance with this invention would find application in a very large variety of internal combustion engines. One particularly important application would be for small compression ignition engines adapted for powering automobiles. Lighter truck engines and medium range horsepower engines could also benefit from the use of injectors designed in accordance with the subject invention.

I claim:

1. A fuel injector for use in an injector receiving recess of an internal combustion engine for injecting periodically into a combustion chamber of the engine a portion of the fuel received from a supply port opening into the recess and for returning the remaining portion of the fuel received from the supply port to an axially spaced drain port which also opens into the recess, said fuel injector comprising:

(a) an injector body shaped to be inserted into the recess to form a supply flow path extending between the supply port and the exterior surface of said injector body and to form a drain flow path, isolated from the supply flow path, extending between the drain port and the exterior surface of said injector body, said injector body containing
(1) a central bore, and
(2) an open injection orifice located adjacent the inner end of said central bore;

(b) supply connecting means providing a pathway for fuel under pressure to flow from the supply flow path into the central bore, said supply connecting means containing a supply passage extending from the exterior surface of said injector body to the interior surface of the central bore along a straight radial path perpendicular to the longitudinal axis of said injector body;

(c) drain connecting means for providing a pathway for fuel to flow from the central bore into the drain flow path; and (d) an injector plunger mounted for reciprocal movement within the central bore between an innermost position in which the injection orifice is closed by the inner end of said injector plunger and an outermost position in which an injection chamber is formed within the central bore between the inner end of said injector plunger and the open injection orifice, said injector plunger including flow control means for forming a scavenge flow path to cause a scavenging and cooling flow of fuel from said supply passage, through said central bore and out of said injector body whenever said injector plunger is less than a first predetermined axial distance from the innermost position and for allowing fuel to be metered into the injection chamber from the supply passage whenever said injector plunger is moved more than a second predetermined axial distance from the innermost position.

2. A fuel injector as defined in claim 1, in which said flow control means includes an annular groove on the exterior surface of said injector plunger for forming the scavenge flow path extending axially from the supply passage to the drain passage whenever said injector plunger is in the innermost position and a cylindrical land cooperating with the interior surface of the central bore to form a seal between the scavenge flow path and the injection chamber.

3. A fuel injector as defined in claim 1 or 2, in which and drain connecting means includes a drain passage extending from the exterior surface of said injector body to the interior surface of the central bore along a straight radial path perpendicular to the longitudinal axis of said injector body.

4. A fuel injector as defined in claim 2, in which the shape of the supply passage defined by said supply connecting means is chosen to cause the amount of fuel metered into the injection chamber during each injection cycle to be dependent on both the pressure of the fuel supplied through the supply port and the total time during which said injector plunger is more than the first predetermined axial distance from its innermost position.

5. A fuel injector as defined in claim 2, in which the first predetermined distance is less than the second predetermined distance by an amount equal to the axial extent of said cylindrical land plus the axial extent of the opening of the supply passage into the central bore.

6. A fuel injector as defined in claim 1, in which said injector body contains on its exterior surface first and second annular recesses axially spaced along said injector body to communicate with the supply port and the drain port, respectively, when said injector body is operatively positioned within the injector receiving recess.

7. A fuel injector as defined in claim 6, further including seal means for forming circumferential seals between the exterior of said injector body and the interior surface of the injector receiving recess to isolate the supply flow path from the drain flow path.

8. A fuel injector as defined in claim 1, in which said injector body includes exterior screw threads on its outer end for mating with interior screw threads on the interior of the injector receiving recess and wherein said injector body contains a socket at its outer end shaped to receive a torque applying wrench.

* * * * *